(12) United States Patent
Young et al.

(10) Patent No.: US 6,460,445 B1
(45) Date of Patent: Oct. 8, 2002

(54) PAYLOAD DISPENSING SYSTEM

(76) Inventors: Eric P. Young, 63 N. Meredith Ave., Pasadena, CA (US) 91106; John Reynolds, 25805 Browning Pl., Stevenson Ranch, CA (US) 91381; Brian Hershberger, 15638 View Ridge La., Granada Hills, CA (US) 91344

( * ) Notice: Subject to any disclaimer, the term of this patent is extended or adjusted under 35 U.S.C. 154(b) by 0 days.

(21) Appl. No.: 10/038,424

(22) Filed: Jan. 7, 2002

(51) Int. Cl.[7] .................................................. B64D 1/04
(52) U.S. Cl. ........................ 89/1.51; 89/1.54; 89/1.59; 244/137.4; 294/82.26
(58) Field of Search ...................... 244/137.4, 137.1; 89/1.51, 1.54, 1.56, 1.58, 1.59; 294/82.26

(56) References Cited

U.S. PATENT DOCUMENTS

| | | | |
|---|---|---|---|
| 4,132,147 A | * | 1/1979 | Contaldo .................. 244/137.4 |
| 4,257,639 A | | 3/1981 | Stock |
| 4,399,968 A | | 8/1983 | Stock et al. |
| 4,523,731 A | * | 6/1985 | Buitekant et al. ............. 24/453 |
| 4,679,751 A | | 7/1987 | Peterson |

* cited by examiner

Primary Examiner—J. Woodrow Eldred

(57) ABSTRACT

A payload dispensing system for an aircraft is disclosed that includes a housing mounted to the aircraft. A hollow shaft is mounted to the housing having an open first end and a closed off second end with a hole therethrough. The payload includes an aperture having a first end on an external surface thereof and a second end in the interior therein. A wire cable releasably secures the payload to the housing such that the hollow shaft extends into the aperture of the payload. A compression spring is mounted at least partially within the hollow shaft, having a first end in contact with the second end of the hollow shaft and a second end in contact with the second end of the aperture within the payload, the spring having a compressed position when the hollow shaft is within the aperture in the payload and asserts a force tending to separate the payload from the aircraft. A cable cutter is used to cut the cable to release the payload from the housing, such that the spring forces the payload away from the aircraft and the hollow shaft guides the payload during separation.

7 Claims, 5 Drawing Sheets

PLAYLOAD DISPENSING SYSTEM

BACKGROUND OF THE INVENTION

1. Field of the Invention

The invention relates to the field of payload dispensing systems for aircraft and the like and, in particular, to a simplified payload dispensing system that both ejects and guides the payload during separation.

2. Description of Related Art

On low speed, subsonic aircraft, weapons, whether carried on the wing, underside of the fuselage or within a weapon bay, can be gravity dropped with acceptable separation characteristics. The weapons are released from the bomb rack and armed after release. The very early aircraft used mechanical means to accomplish release, while more modern aircraft use solenoid or power operated hooks. But, with high-speed jet aircraft, which fly at high subsonic and supersonic speeds, gravity weapon release, particularly from an internal weapon bay is dangerous and can result in unpredictable trajectories. This occurs because at the high level of air turbulence about the aircraft at supersonic speeds. In addition, shock waves are formed which exacerbates the problem. Thus, the weapon must be physically ejected.

A typical bomb rack comprises hooks for suspending and releasing the weapon, sway braces for stabilizing and hydraulic or explosively actuated ejectors. In operation, the release cycle takes but milliseconds from the time the weapon is released to the forcible ejection. The ejectors can be programmed so as to vary the force at which the missile is ejected and also the pitch angle (different force levels in each ejector). Typical ejectors are disclosed in U.S. Pat. No. 4,399,968 "Controlled Output Force Actuator" by Stock et al. and U.S. Pat. No. 4,257,639, "Ejector Device for Storage" by Stock. By forcibly ejecting the weapon the exposure to turbulent airflow is kept to a minimum and the weapon will have considerable momentum so as to pass quickly through the turbulent air. This provides a more positive means of safe separation. The disadvantage is that during ejection the weapon immediately loses contact with the sway braces and stabilizing is solely dependent upon the force applied to the weapon.

Another approach is to mount the rack on a four bar link assembly and lower the weapon out of the weapon bay prior to ejection. This provides stabilization and does position the weapon away from the aircraft. But, when launching missiles it is desirable to provide not only safe separation from the aircraft, but a forward velocity thereto. While the extension of the parallel links and solenoid operated hook release could be coordinated so that such a directional thrust is obtained; there would always be the possibility that the weapon would be lowered but the hooks failing to release. The resulting loads on the links and supporting structure would be quite large. Therefore, it would be desirable to have automatic mechanical release.

Such a system was disclosed in U.S. Pat. No. 4,679,751 Weapon Dispensing System by P. Peterson. This system includes a weapon positioning assembly for positioning the weapon in a stored position and a release position. The weapon positioning assembly comprises a weapon support rack and a pair of fore and aft links having first and second ends. The first ends of the links are pivotally coupled to the aircraft and the second ends are pivotally coupled to the rack. An actuator assembly is coupled by its first end to the aircraft and by its second end to the weapon positioning assembly. It is adapted to move the positioning assembly from the stored position to the release position. Fore and aft weapon-attaching devices for releasably locking the weapon to the rack are attached to the weapon positioning assembly. The weapon releasing devices are adapted to lock the weapon to the rack when the weapon position assembly is in the stored position and to only unlock the weapon when it is in the release position. Thus, upon actuation, the rack, with the weapon locked thereto, is rotated in a downward and forward direction and automatically released when the release position is reached. This system, as well as the other prior art systems that deal with ejecting explosive weapons, are complicated and expensive.

Thus, it is a primary object of the subject invention to provide a dispensing system for ejecting a payload from an aircraft maintaining a positive positional control throughout the ejection stroke.

It is another primary object of the subject invention to provide a payload dispensing system for an aircraft wherein the payload can be stored internally and positive positional control is maintained until the payload has cleared the interior of the aircraft.

Another object of the subject invention is to provide a payload dispensing system for an aircraft wherein the release of the payload is automatically accomplished by mechanical means.

SUMMARY OF THE INVENTION

The invention is a payload dispensing system for an aircraft. In detail, the invention includes a housing mounted to the aircraft. A hollow shaft is mounted to the housing having an open first end and a closed off second end with a hole therethrough. The payload includes an aperture having a first end on an external surface thereof and a second end terminates in the interior thereof. A restraint system releasably secures the payload to the housing such that the hollow shaft extends into the aperture of the payload. Preferably, the restraint system includes an endless cable assembly extending about a first pin mounted in the second or bottom end of the aperture in the payload, extending through the hollow shaft and about a second pin mounted to the housing.

A compression spring is mounted at least partially within the hollow shaft, having a first end in contact with the end of the hollow shaft and a second end in contact with the second or bottom end of the aperture. The spring has a compressed position when the hollow shaft is within the aperture and asserts a force tending to separate the payload from the aircraft. A cable cutter is mounted on the housing for releasing the payload from the housing, such that upon cutting of the cable, the spring forces the payload away from the aircraft and the hollow shaft guides the payload during separation.

The payload dispensing system further includes a payload tensioning system for adjusting the tension load on the endless cable to insure that the payload is rigidly attached to the housing. This is accomplished by incorporating a threaded hole in the second pin and having the second pin movably mounted within a slot in the housing. A threaded screw is rotatably mounted within the housing and extends through the slot and also engages the threaded hole in the second pin. Thus as the threaded screw is rotated the second pin is translated in the slot such that it applies a tension load to the cable assembly.

A cable cutter assembly is provided for cutting the cable allowing the payload to separate from the housing. In one embodiment, a rotary actuator is mounted on the housing having an output shaft. An arm assembly is attached by a first end to the output shaft of the rotary actuator and a second end attached to knife blade; such that rotation of the output shaft moves the knife blade into contact with the cable assembly severing same and releasing the payload.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

DESCRIPTION OF THE PREFERRED EMBODIMENT

Figure 1:
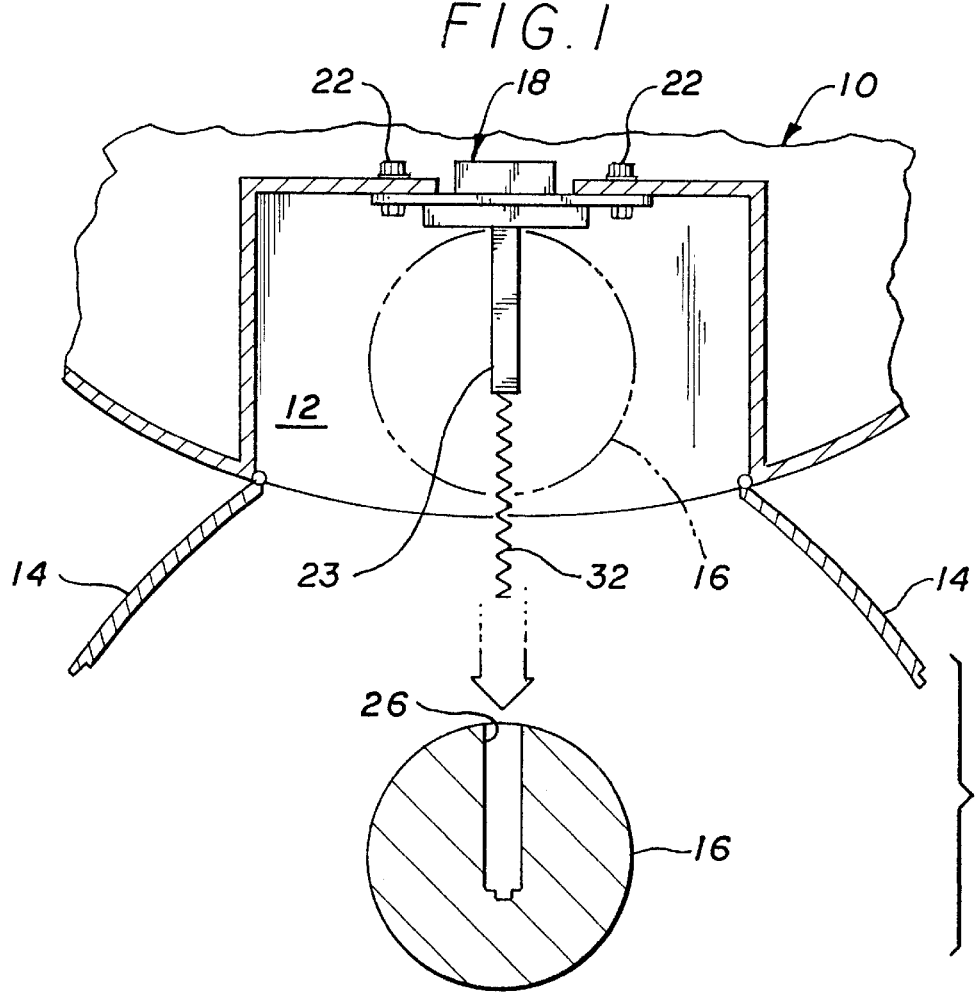
FIG. 1 is a partial view of the payload bay of an aircraft.
Figure 4:
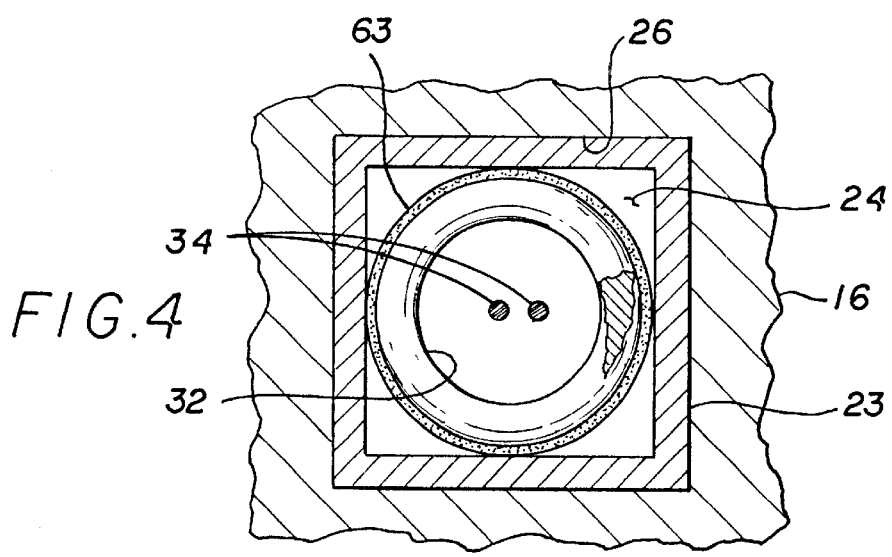
FIG. 4 is a partial cross-sectional view of FIG. 2 taken along the line 4—4.
Figure 2:
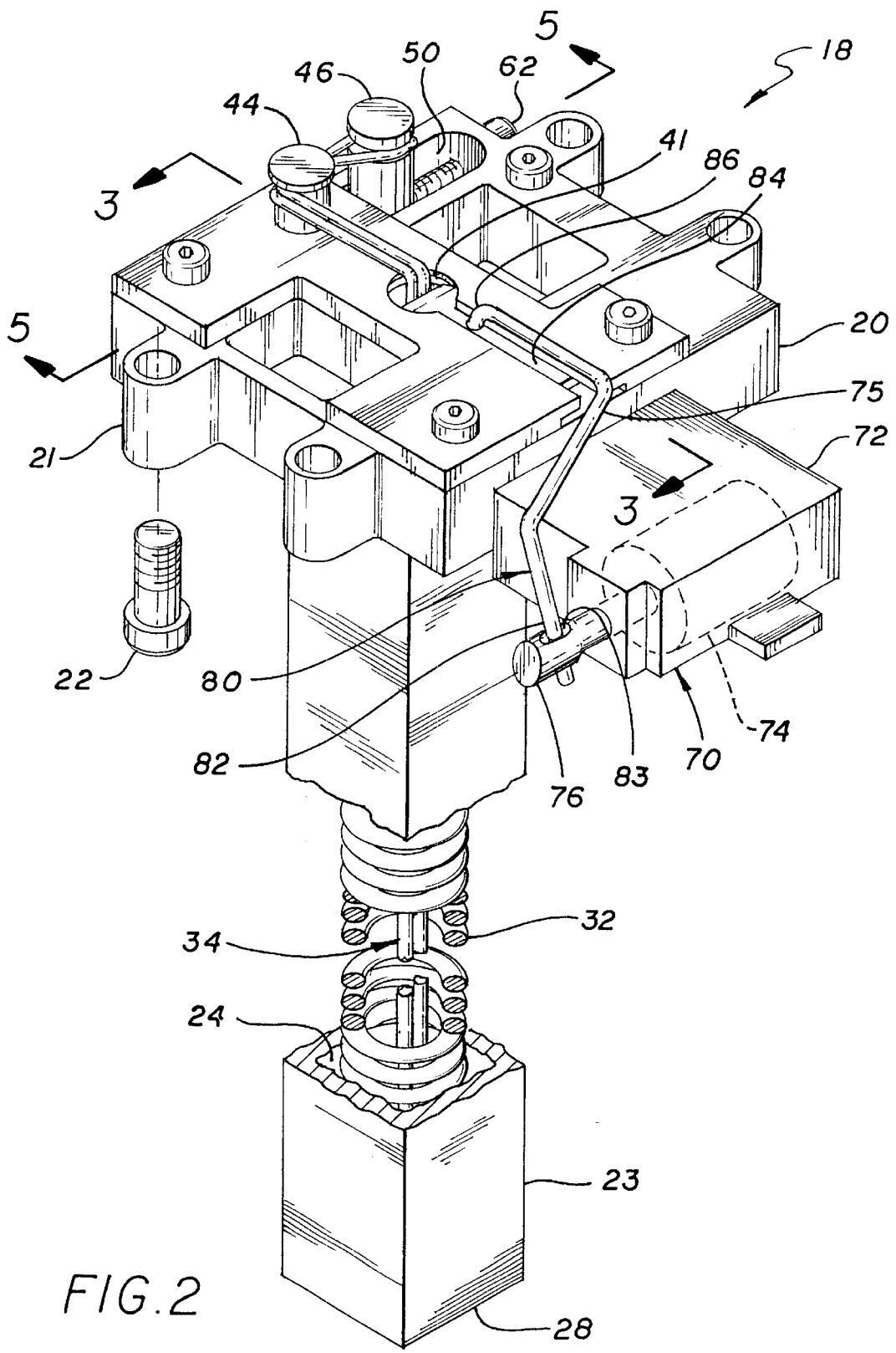
FIG. 2 is a perspective view of the payload dispensing system shown in FIG. 1.

Referring to FIGS. 1–4, an aircraft 10 is illustrated having a payload bay 12 with open doors 14. The payload 16 is shown installed in the bay 12 mounted to the payload dispensing system 18. Referring particularly to FIG. 2, it can be the dispensing system includes a housing 20 with mounting flanges 21 attached to the aircraft by fastener assemblies 22. The housing 20 includes a hollow square shaft 23 having an interior passageway 24 in slidable engagement with a square aperture 26 in the payload 16. The end 28 of the shaft 23 is in contact with the bottom end 30 of the passageway 24. A compression spring 32 is mounted within the hole 26. Thus the spring 32 biases the payload 16 away from the aircraft 10.

A cable assembly 34, in the form of an endless cable (loop) is attached to a pin 36 in the bottom end 30 of the aperture 26. In particular, the cable assembly is looped over the pin 36 and engages a notch 40 therein. The cable assembly 34 extends up the passageway 24 and exits a hole 41 in the housing 20 and wraps about a T shaped post 44 and thereafter loops about a cord tension member 46, movably mounted in a groove 47. The member 46 has a diameter 48 and includes a threaded hole 49 and is mounted in a slot 50 having ends 52 and 54, and translatable therein. The slot has a width, indicated by numeral 51, which is just slightly larger than the diameter 48 of the member 46, thus preventing lateral movement of the member. The housing 20 includes a hole 56 extending from the side 58 of the housing 20 to the end 52 of the slot 50. A hole 60 is located at the end 54 of slot 50 and aligned with the treaded hole 49. A fastener 62 having a threaded portion 64 threadably engaged with hole 49 in the member 46 and non-threaded portions 66A and 66B in engagement with holes 56 and 60. The rotation of the fastener 62 will cause the member 46 to translate in the slot 50. Therefore, with the cable assembly 34 looped about the member 46 in the groove 47, rotation of the fastener 62 will cause the tension in the cable assembly 34 to increase or decrease, depending upon the direction of rotation.

Figure 3:
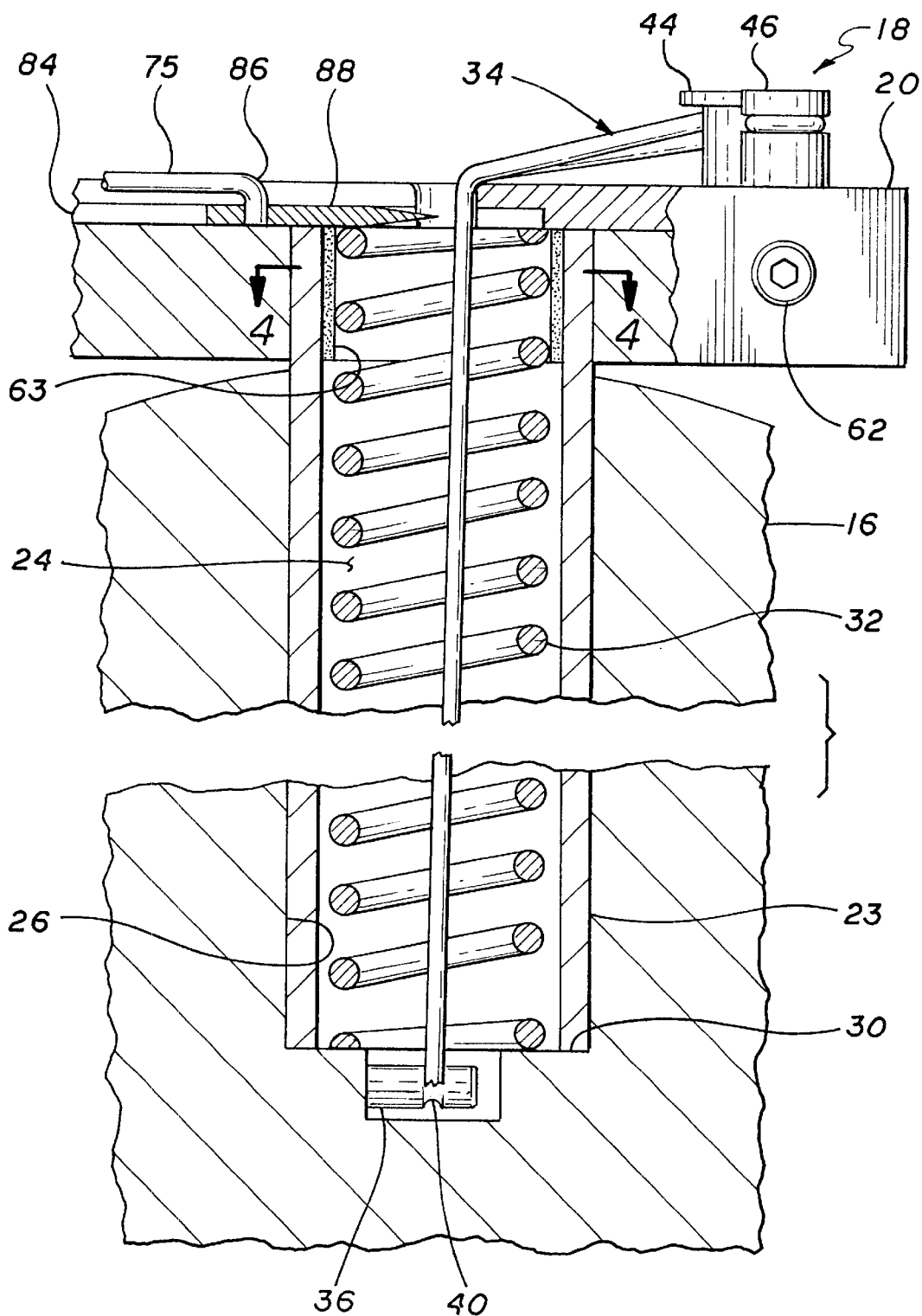
FIG. 3 is a partial cross-sectional view of FIG. 2 taken along the line 3—3.
Figure 5:
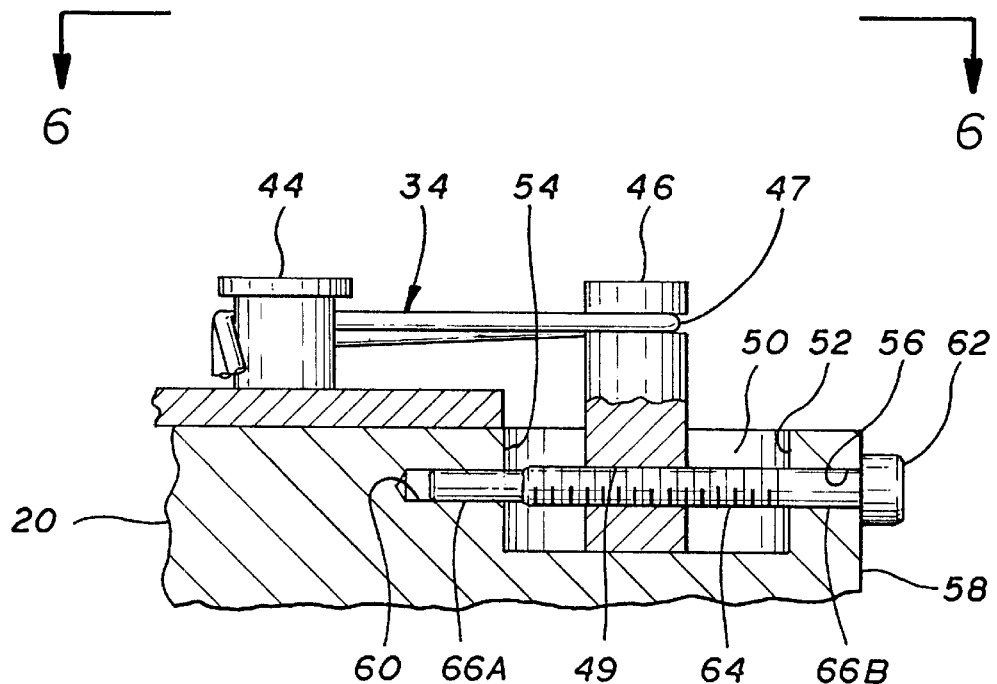
FIG. 5 is a partial cross-sectional view of FIG. 2 taken along the line 5—5
Figure 6:
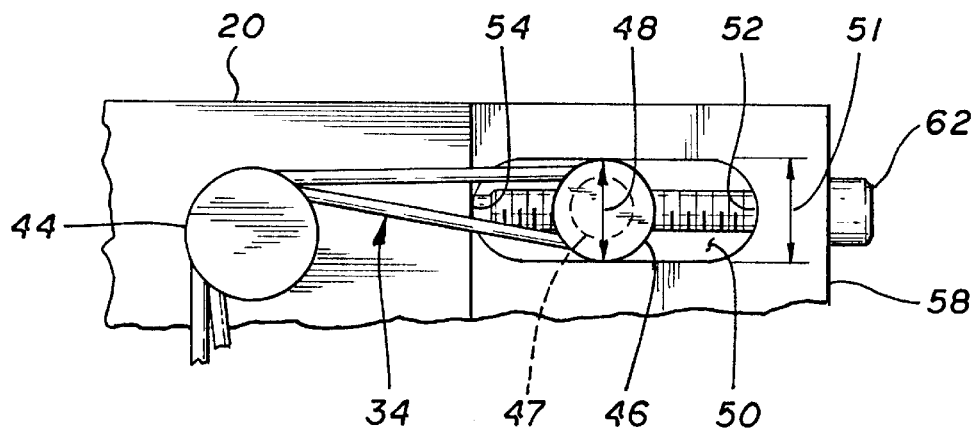
FIG. 6 is view of FIG. 5 taken along the line 6—6.

The cable assembly 34 is attached to the pin 36 in the payload 16 and a line (not shown is also attached to the cable assembly 34 and threaded through the hole 41 in the housing 20. The payload 16 is raised up into the bay 12 by a conventional hoist (not shown) with the square shaft 23 aligned with aperture 26 in the payload 16. The payload is raised upward until fully installed on the shaft 23. Thereafter, the cable assembly 34 is pulled upward compressing the spring 32 by the previously mentioned line and thereafter wrapped around the post 44 and looped about the member 46 into the groove 47. The fastener 62 is then rotated until the cable assembly 34 is taught. At this point, the payload 16 is safely mounted to the housing 20. Referring particularly to FIG. 3 and additionally to FIG. 4, the spring 32 is retained within the hole 24 of the shaft 23 by means of friction tape 63 place thereabout and which contacts the passageway 24 walls.

Referring to FIGS. 1–6, in order to release the payload 16, the cable assembly 34 must be cut. This is accomplished by a cable cutter assembly, generally indicated by numeral 70. The cable cutter assembly 70 includes a servo-actuator housing 72 attached to one side of the housing 20 that contains a servo-actuator 74 having a output shaft 76. A bent rod linkage assembly 80 includes a first end 82 in engagement with a hole 83 in the output shaft 76 of the servo-actuator 74. A center portion 75 of the linkage assembly 80 extends upward and over the housings 72 and 20 and slidably engages an inverted T slot 84 aligned with the hole 41 in the housing. The second end 86 connects to a knife blade 88 in the base portion of the slot 84. The base portion of the slot 84 extends beyond the hole 41. Upon actuation of the servo-actuator 74, the knife blade 88 is forced into the cable assembly 34 severing it. This will allow the spring 32 to push the payload 16 out of the payload bay 12 with the shaft 23 guiding the payload. Note that the friction tape 63 prevents the spring 32 from leaving the passageway 24.

Figure 7:
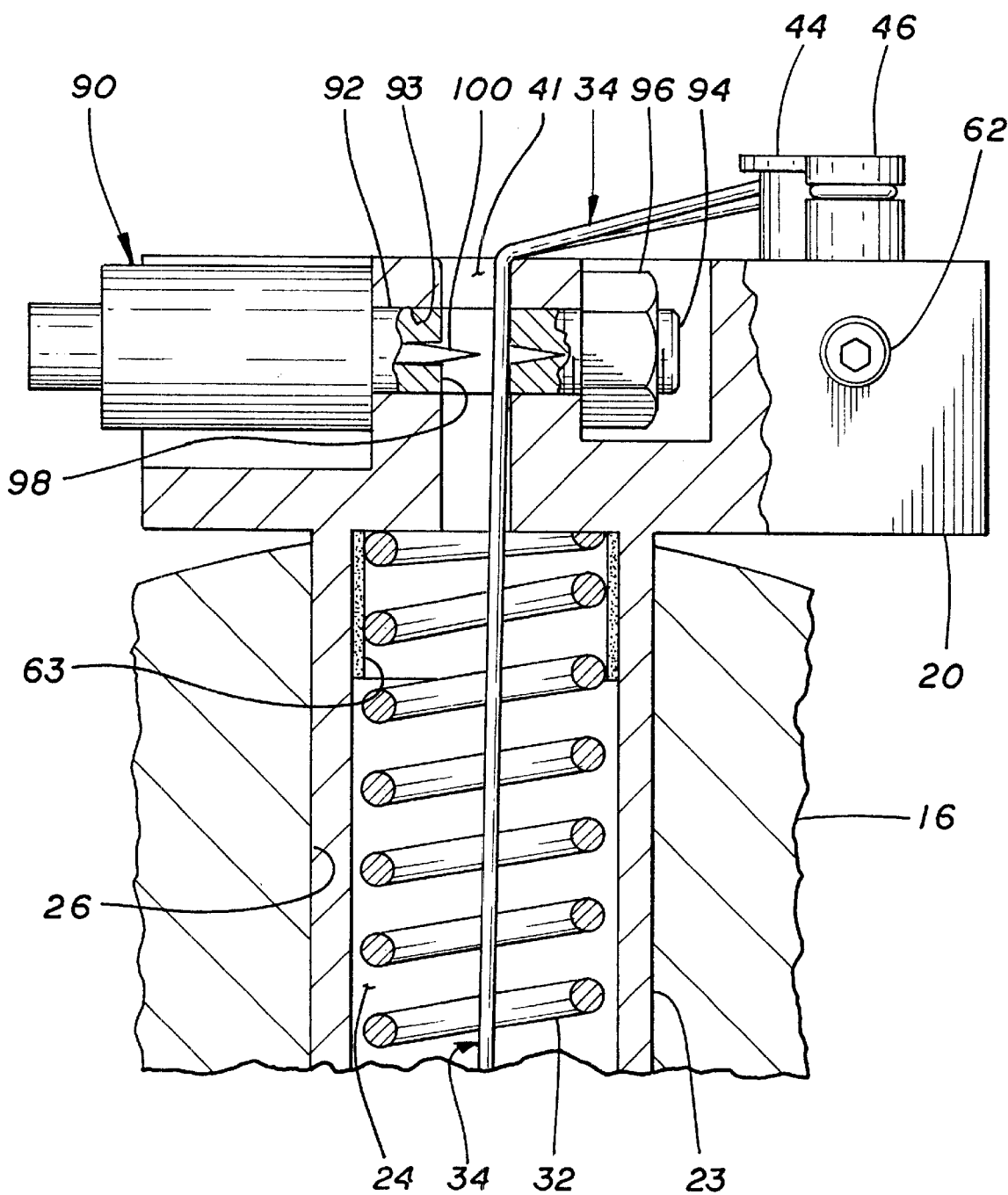
FIG. 7 is partial cross-sectional view similar to FIG. 3 illustrating an alternate actuation system for releasing the payload.

Referring to FIG. 7, an alternate method is to use a pyrotechnic actuator, indicated by numeral 90 mounted in the housing 20. Here a cylindrical cutter portion 92 is mounted in a hole 93 extending through the hole 41. A threaded end 94 and nut 96 secure the actuator 90 to the housing 20. The cylindrical portion 92 includes a hole 98 through which the cable assembly 34 passes. Upon actuation, the cutting blade 100 will sever the cable assembly; again allowing guided separation of the payload 16.

Thus it can be seen that the payload dispensing system 18 is simple and inexpensive and provides support for the payload. Depending upon the size and weight of the payload 16, the cable assembly 34 can be made of synthetic fiber or high strength steel. If made of steel, the pyrotechnic actuator 90 would probably be preferred because of the tremendous force available from explosive actuated devices.

While the invention has been described with reference to a particular embodiment, it should be understood that the embodiment is merely illustrative, as there are numerous variations and modifications, which may be made by those skilled in the art. Thus, the invention is to be construed as being limited only by the spirit and scope of the appended claims.

INDUSTRIAL APPLICABILITY

The invention has applicability to the aircraft industry.

What is claimed is:

1. A payload dispensing system for an aircraft comprising:
   a housing mounted to aircraft;
   a hollow shaft mounted to said housing having an open first end and a closed off second end with a passageway therethrough;
   the payload having an aperture having a first end on an external surface thereof and a second end in the interior therein;
   first means to releasably secure the payload to the housing such that said hollow shaft extends into said aperture of the payload;
   a compression spring mounted at least partially within said hollow shaft, having a first end in contact with said second end of said hollow shaft and a second end in contact with the second end of said aperture, said spring having a compressed position when said hollow shaft is within said aperture and asserts a force tending to separate the payload from the aircraft, and
   second means to cause said first means to release the payload form said housing;
   such that said spring forces the payload away from the aircraft and said hollow shaft guides the payload during separation.

2. The payload dispensing system as set forth in claim 1 wherein said first means is a cable assembly attached between the second end of said aperture and said housing.

3. The payload dispensing system as set forth in claim 2 wherein:
   the payload includes a first pin mounted in the bottom of said aperture; and
   a second pin mounted on said housing;
   said cable assembly is a endless cable extending about said first cable through said hollow shaft and extending about said second pin.

4. The payload dispensing system as set forth in claim 3 comprising third means for adjusting the tension load on said endless cable.

5. The payload dispensing system as set forth in claim 4 wherein said third means comprising:
   said housing having a slot;
   said second pin movably mounted in said slot and having a threaded hole therethrough; and
   a threaded screw rotatably mounted in said housing and extending through said slot and threadably engaging said threaded hole in said second pin;
   such that rotation of said screw causes said second pin to translate along said screw.

6. The payload dispensing system as set forth in claim 1, or 2, or 3, or 4, or 5 wherein said second means is an explosively actuated cable cutter coupled to said cable assembly.

7. The payload dispensing system as set forth in claim 1, or 2, or 3, or 4, or 5 wherein said second means is a cable cutter assembly comprising:
   a rotary actuator mounted on said housing having an output shaft; and
   an arm assembly having first and second ends, said first end coupled to said output shaft and said second end having a knife bade mounted thereto;
   such that rotation of said output shaft moves said knife blade into contact with said cable severing it and releasing the payload.

* * * * *